(12) United States Patent
Algrain

(10) Patent No.: US 8,716,896 B2
(45) Date of Patent: May 6, 2014

(54) GENSET CONTROL SYSTEM IMPLEMENTING ENGINE SYNCHRONIZATION

(75) Inventor: Marcelo C. Algrain, Dunlap, IL (US)

(73) Assignee: Caterpillar Inc., Peoria, IL (US)

(*) Notice: Subject to any disclaimer, the term of this patent is extended or adjusted under 35 U.S.C. 154(b) by 892 days.

(21) Appl. No.: 12/314,575

(22) Filed: Dec. 12, 2008

(65) Prior Publication Data
US 2010/0148588 A1    Jun. 17, 2010

(51) Int. Cl.
*H02J 3/00*    (2006.01)

(52) U.S. Cl.
USPC .............................................. 307/84; 307/87

(58) Field of Classification Search
USPC ..................................................... 307/84–87
See application file for complete search history.

(56) References Cited

U.S. PATENT DOCUMENTS

| | | | |
|---|---|---|---|
| 2,887,589 A | 5/1959 | Trottier | |
| 2,929,941 A | 3/1960 | Bobo | |
| 4,356,402 A * | 10/1982 | Morimoto et al. | 307/19 |
| 4,575,671 A | 3/1986 | Lee et al. | |
| 4,743,777 A | 5/1988 | Shilling et al. | |
| 5,055,764 A | 10/1991 | Rozman et al. | |
| 6,049,194 A | 4/2000 | Nakagawa et al. | |
| 6,346,797 B1 | 2/2002 | Perreault et al. | |
| 6,605,928 B2 | 8/2003 | Gupta et al. | |
| 6,657,416 B2 * | 12/2003 | Kern et al. | 322/29 |
| 6,707,279 B2 | 3/2004 | Stefanovic et al. | |
| 6,826,499 B2 | 11/2004 | Colosky et al. | |
| 7,116,082 B1 | 10/2006 | Baumgart | |
| 7,253,590 B2 | 8/2007 | Suzuki et al. | |
| 7,370,508 B2 | 5/2008 | Moriarty | |
| 8,358,036 B2 * | 1/2013 | Dozier et al. | 307/84 |
| 8,432,065 B2 * | 4/2013 | Reinkens | 307/87 |
| 2007/0063677 A1 | 3/2007 | Schauder | |

FOREIGN PATENT DOCUMENTS

| | | |
|---|---|---|
| EP | 2201673 | 10/2007 |
| EP | 2346159 | 10/2007 |
| WO | 2009013155 | 1/2009 |

* cited by examiner

*Primary Examiner* — Fritz M Fleming
(74) *Attorney, Agent, or Firm* — Finnegan, Henderson, Farabow, Garrett & Dunner LLP

(57) ABSTRACT

A control system for use with a genset is disclosed. The control system may have a bus configured to receive power from the generator set, and a first sensor configured to generate a first signal indicative of a characteristic of power on the bus. The control system may also have a second sensor configured to generate a second signal indicative of an engine parameter of the generator set, and a controller in communication with the first and second sensors. The controller may be configured to synchronize an electrical output of the generator set with the power on the bus based on the first and second signals.

19 Claims, 2 Drawing Sheets

_US 8,716,896 B2_

GENSET CONTROL SYSTEM IMPLEMENTING ENGINE SYNCHRONIZATION

TECHNICAL FIELD

The present disclosure relates generally to a genset control system and, more particularly, to a genset control system implementing engine synchronization.

BACKGROUND

Many power systems have multiple generator sets for supplying electricity to external power loads. Often, these generator sets are connected to supply the power in parallel via a common bus. After one generator set is connected to the common bus, any additional generator sets subsequently connected to the bus should produce power matching the voltage, frequency, and phase angle of the power produced by the first generator set. This matching is also known as electrically synchronizing the generator sets. A better sync, results in a smoother transition and a lower shock on the generator and load.

An example of a power system that utilizes electrical synchronizing of multiple generator sets is described in U.S. Pat. No. 4,575,671 (the '671 patent) issued to Lee et al. on Mar. 11, 1986. The '671 patent discloses a method for synchronizing multiple motor-driven generators wherein each generator includes an associated position indicator that provides an indication each time the generator's rotor is at a predetermined rotational position relative to the generator's stator. The method includes connecting a first motor to an AC power source, and permitting the first motor to drive an associated first generator until the first generator produces a voltage having a desired frequency. The method further includes connecting the first generator to an output bus. The method then includes connecting a second motor to the AC power source, and permitting the second motor to drive an associated second generator until the second generator produces a voltage having a frequency and amplitude substantially equal to the amplitude and frequency of the output bus voltage. The method also includes comparing a time of occurrence of a position indication associated with the first generator with a time of occurrence of a second position indication associated with the second generator, and selectively disconnecting and reconnecting the second motor from the second generator until the times of occurrence are within a predetermined interval.

Although the method of the '671 patent may allow phase, frequency, and voltage matching based on rotor shaft position, it may be sub-optimal. That is, the system of the '671 patent, because it relies on the monitoring of electrical power produced by the multiple generator sets and on mechanical monitoring of the generators, may have synchronization time that is slower than desired.

The genset control system of the present disclosure addresses one or more of the problems set forth above.

SUMMARY

In one aspect, the present disclosure is directed toward a control system for use with a generator set. The control system may include a bus configured to receive power from the generator set, and a first sensor configured to generate a first signal indicative of a characteristic of power on the bus. The control system may also include a second sensor configured to generate a second signal indicative of an engine parameter of the generator set, and a controller in communication with the first and second sensors. The controller may be configured to synchronize an electrical output of the generator set with the power on the bus based on the first and second signals.

In another aspect, the present disclosure is directed toward a control system for use with a first generator set and a second generator set. The control system may include a first sensor configured to generate a first signal indicative of an engine parameter of the first generator set, and a second sensor configured to generate a second signal indicative of an engine parameter of the second generator set. The control system may also include a controller in communication with the first and second sensors. The controller may be configured to synchronize an electrical output of the first generator set with an electrical output of the second generator set based on the first and second signals.

In another aspect, the present disclosure is directed toward a method of providing power. The method may include monitoring a characteristic of power on a bus, operating a generator set to produce an electrical output, and sensing an engine parameter of the generator set. The method may further include synchronizing the electrical output of the generator set with the power on the bus based on the characteristic and the engine parameter.

In another aspect, the present disclosure is directed toward a method of providing power. The method may include operating a first generator set to produce electrical power, and monitoring a first engine parameter of the first generator set. The method may further include operating a second generator set to produce electrical power, and monitoring a second engine parameter of the second generator set. The method may also include synchronizing the electrical power produced by the second generator set with the electrical power produced by the first generator set based on the first and second engine parameters

DETAILED DESCRIPTION

Figure 1:
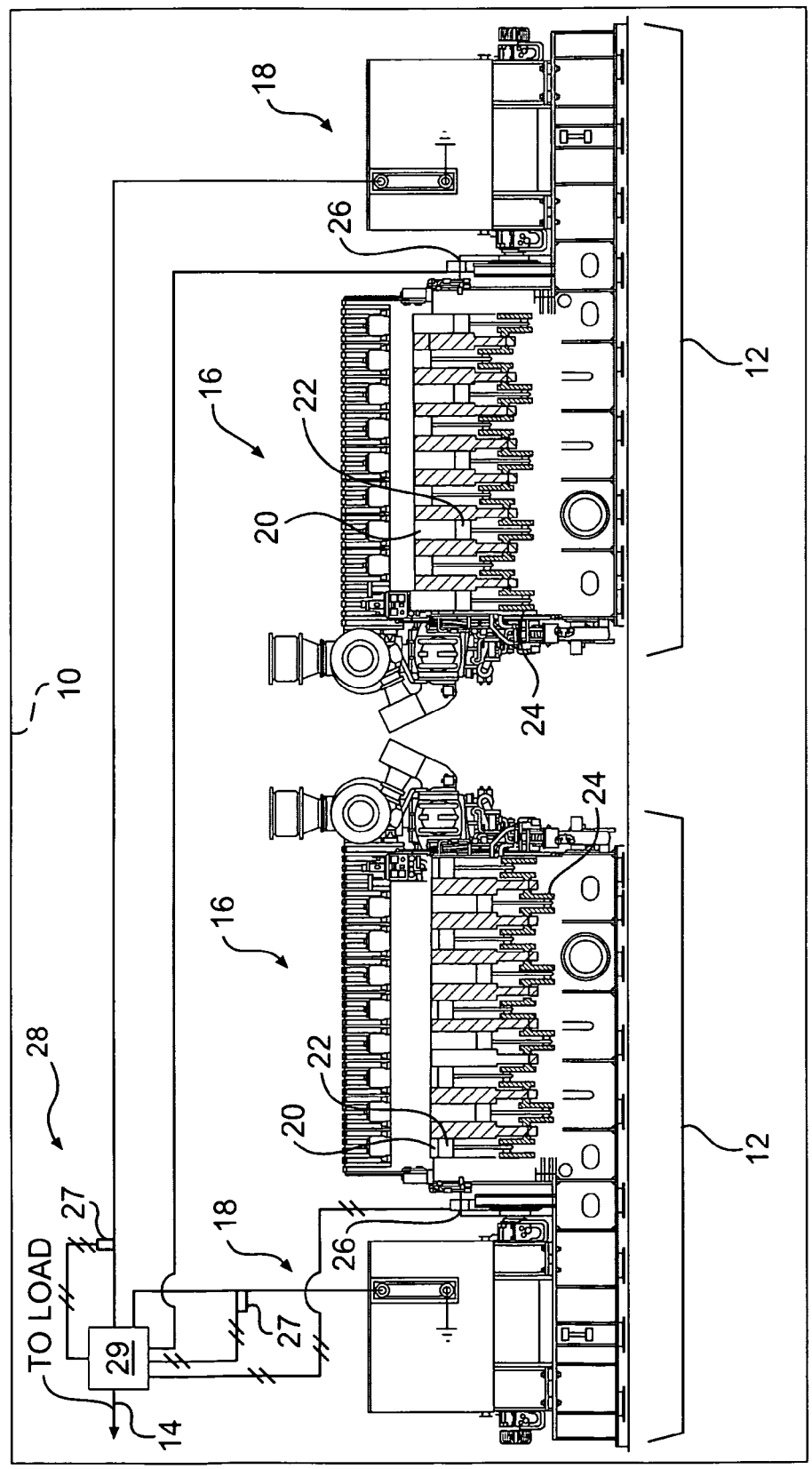
FIG. 1 is a pictorial illustration of one exemplary disclosed power system.

FIG. 1 illustrates a power system 10 configured to supply electricity to a power load (not shown). Power system 10 may embody, for example, a stationary land-based power plant or the prime mover of a mobile land- or marine-based machine. In the embodiment of FIG. 1, the power load may include any device or devices that require uninterrupted electricity to perform one or more tasks, including, but not limited to, electric lights, consumer devices, and industrial drive motors. In some embodiments, the power load may require electric power in a particular form, such as three-phase alternating current having a frequency of 50 or 60 Hz. Power system 10 may include at least two generator sets (gensets) 12 operable to generate electricity, and a power-transmission network such as a common bus 14 for transferring electricity from gensets 12 to the power load. In one embodiment, each genset may include an engine 16 drivingly coupled to a generator 18. Although shown end-to-end, generator sets 12 may alternatively be located side-by-side or in a random arrangement within a common power room.

Each engine 16 may be any type of heat engine operable to produce mechanical power by combusting fuel, including, for example, a diesel engine, a heavy fuel engine, a gasoline engine, and a gaseous fuel-powered engine. In the illustrated embodiment, each engine 16 may include a plurality of cylinders 20, each having an associated piston 22 connected to a common crankshaft 24

A sensor 26 may be associated with each engine 16 to detect an instantaneous position of each crankshaft 24. In one embodiment, sensor 26 may be, for example, an impulse transmitter configured to generate a pulse signal each time crankshaft 24 passes through a particular angle. For example, when crankshaft 24 of one engine 16 rotates an imbedded magnet through a position at which sensor 26 is closest to and interacts with the magnet, the associated impulse transmitter may generate a first electronic pulse. Similarly, when crankshaft 24 of a second engine 16 rotates an imbedded magnet through a position at which sensor 26 is closest to and interacts with the magnet, the associated impulse transmitter may generate a second electronic pulse. In this example, when the first and second electronic pulses are generated at about the time intervals, the engines may be operating at about the same speed (i.e., crankshafts 24 may be rotating at about the same frequency). Further, because of a fixed coupling between crankshafts 24 and the rotors (not shown) of the associated generator 18, the electronic pulses from sensors 26 may provide indications of a frequency and a phase of electrical power produced by generators 18. It is contemplated that sensor 26 may alternatively be directly associated with generators 18, for example with the rotors that are directly driven by engine 16, and/or with windings (not shown) of generators 18.

Each generator 18 may be any type of power producing device mechanically coupled to receive power from engine 16 and convert at least a portion of that mechanical power into electricity. For example, each generator 18 may embody an AC induction generator, a permanent-magnet generator, an AC synchronous generator, or a switched-reluctance generator. In one embodiment, each generator 18 may include seven pairings of poles (not shown), each pairing having three phases arranged on a circumference of a stator (not shown) to produce an alternating current with a frequency of 50 or 60 Hz.

Power system 10 may also include a synchronizing and load sharing control system 28 to regulate operation of power system 10. Control system 28 may include commonly known components that cooperate to synchronize the electrical output of multiple gensets 12, and to combine the output into a common supply of power directed to the load by way of common bus 14. For example, control system 28 may include, among other things, a controller 29, and one or more breakers (not shown) connected between each generator 18 and common bus 14 and/or between common bus 14 and the load to selective connect the electrical output from one or both generators 18 to common bus 14 and/or to selectively connect common bus 14 to the load in response to commands from controller 29. In addition, controller 29 may be in communication with each engine 16, each generator 18, and each sensor 26 to monitor and/or control one or more aspects of genset operation. Controller 29 may further include one or more sensing devices 27 to receive input regarding monitored characteristics of electricity generated by each genset 12 such as the current, frequency, phase, and/or voltage. Additionally, controller 29 may receive information relating to the amount of power required by the load. For example, controller 29 may receive information such as the current, frequency, phase, and/or voltage along one or more portions of common bus 14, and/or the current, frequency, phase, and/or voltage in one or more components of the load.

Closing a first breaker associated with a first one of generators 18 may electrically connect the output of that generator 18 to common bus 14. To electrically connect an additional generator 18 to common bus 14, it may be required that the output of the additional generator 18 have a voltage, frequency, and phase angle that substantially matches the voltage, frequency, and phase angle of the first connected generator 18 (or of common bus 14). A better match may result in a smoother transition and a lower shock on the load. Controller 29 may regulate operation of the additional genets 12 (i.e., engine 16 and/or generator 18) to vary the electrical output characteristics of the produced power and match the electrical output characteristics of the first generator 18. Once all synchronization conditions (i.e., frequency, phase angle, and voltage) have been met, a breaker close command may be issued by controller 29 to the breaker associated with the second generator 18 and, after a brief actuation delay, the breaker may close.

To reduce synchronization time, controller 29, in addition to or instead of directly synchronizing the electrical power outputs of multiple generators 18, may control mechanical synchronization of the engines 16 driving those generators 18 such that electrical synchronization is subsequently achieved. Specifically, controller 29 may utilize the electronic pulses from sensors 26 to indirectly synchronize the frequency characteristic of the electrical power produced by generator 18 to that of common bus 14 (or to that of a genset 12 already connected to common bus 14). That is, because crankshaft 24 may be mechanically fixed to the rotor of an associated generator 18, the impulse signal from sensor 26, although directly measuring a rotational speed of engine 16, may also provide a reliable indication of a rotational speed of the generator's rotor (i.e., a frequency of the rotor). And, because the electrical output of generator 18 may lag behind the mechanical output of engine 16, this approach to indirectly matching and controlling the electrical frequency characteristic based on a directly measured engine speed may reduce a time required for synchronization.

Controller 29 may also utilize the impulse signal from sensor 26 to synchronize a phase angle characteristic of the electrical power produced by generator 18 to that of common bus 14 (or to that of a genset 12 already connected to common bus 14). Specifically, controller 29 may utilize the electronic pulses from sensors 26 and monitored information from sensing devices 27 to determine a fixed relationship between an angular position of crankshaft 24 and an angular position of the associated generator's rotor. That is, by comparing the time at which the magnet of crankshaft 24 rotates past the corresponding sensor 26 to a monitored phase angle of the electricity produced by generator 18, the fixed relationship may be calculated. And, after an initial calculation during a first operation of genset 12, this fixed relationship may remain substantially unchanged and stored within a memory of controller 29 for use during future synchronization events. Then, based on the impulse signals from sensing devices 27, a monitored phase angle of common bus 14 (or of a genset 12 already connected to common bus 14), and the stored relationship, controller 29 may adjust operation of engine 16 (i.e., momentarily slow down or speed up engine 16) such that the resulting phase angle of the to-be-added generator 18 matches that of common bus 14. As described above, because the electrical output of generator 18 may lag behind the mechanical output of engine 16, this approach to indirectly matching and controlling the electrical phase angle characteristic based on a directly measured crankshaft angular position may reduce a time required for synchronization.

Figure 2:
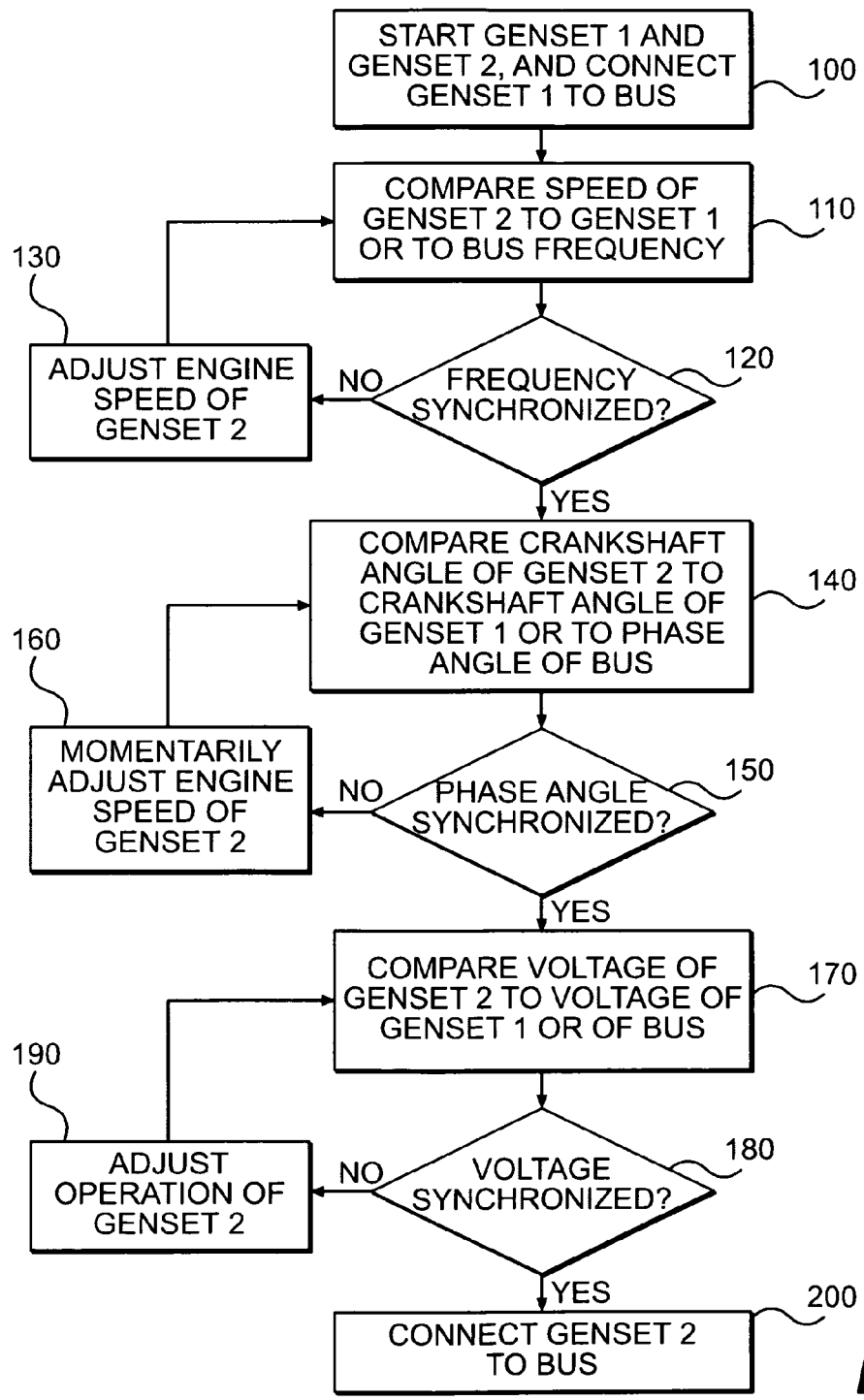
FIG. 2 is a flow chart depicting an exemplary disclosed operation associated with the power system of FIG. 1.

FIG. 2 is a flow chart depicting an exemplary operation of power system 10. FIG. 2 will be discussed in the following section to further illustrate the disclosed system and its operation.

Industrial Applicability

The disclosed power system may have application wherever electrical synchronization between engine-driven genets is desired. During operation of the disclosed power system, electrical and mechanical synchronizing may be performed to produce a common electrical power supply. Operation of power system 10 will now be described.

To initiate operation of power system 10, each genset 12 may be started, and power from one genset 12 may be directed to common bus 14 (Step 100). To start each genset 12, the associated engine 16 may be brought up to speed to drive the connected generators 18. In some situations, bringing engine 16 up to speed may include cranking to initiate combustion. In other situations, engine 16 may already be operating, but at only a standby level. Once the first of engines 16 is brought up to speed and the connected generator 18 is producing power at a level demanded by the external load, controller 29 may issue a breaker close command to electrically connect the output of that generator 18 to common bus 14. Although additional generators 18 may also be producing power at the level demanded by the load, they may remain isolated from common bus 14 until all characteristics of the power output from the additional generators 18 substantially match all characteristics of the power output of the first connected generator 18.

Controller 29 may match the power output from additional generators 18 to that of the first connected generator 18 before additional connections to common bus 14 may be made. For example, controller 29 may monitor and compare an engine speed of the first connected genset 12 or a frequency of the power on common bus 14 to the engine speed of a second genset 12 (Step 110). Based on the comparison, controller 29 may determine if frequency synchronization has been achieved (Step 120). That is, if the engine speed of the second genset 12 does not match the speed of the first genset 12 and/or the frequency of the power on common bus 14 within a desired amount (Step 120: No), controller 29 may adjust the engine speed of the second genset 12 (Step 130), and continue to loop through steps 110-130 until the condition is satisfied.

Once the engine speed of the second genset 12 has been substantially synchronized with the engine speed of the first genset 12 or with the frequency of the power on common bus 14 (Step 120: Yes), controller 29 may then compare the crankshaft angular position of the second genset 12 with the crankshaft angular position of the first genset 12 and/or the phase angle of the power on common bus 14 (Step 140). Based on the comparison, controller 29 may determine if phase angle synchronization has been achieved (Step 150). That is, if the crankshaft angular position of the second genset 12 does not match the crankshaft angular position of the first genset 12 and/or the phase angle of the power on common bus 14 within a desired amount (Step 150: No), controller 29 may momentarily raise or lower the engine speed of the second genset 12 (Step 160), and continue to loop through steps 140-160 until the condition is satisfied.

Once the engine speed and crankshaft angular position of the second genset 12 have been substantially synchronized with the engine speed and crankshaft angular position of the first genset 12 or with the frequency and phase angle of the power on common bus 14 (Step 150: Yes), controller 29 may then compare the voltage output of the second genset 12 with the voltage output of the first genset 12 and/or the voltage of the power on common bus 14 (Step 170). Based on the comparison, controller 29 may determine if voltage synchronization has been achieved (Step 180). That is, if the voltage output of the second genset 12 does not match the voltage output of the first genset 12 and/or the voltage of the power on common bus 14 within a desired amount (Step 180: No), controller 29 may adjust generator operation (e.g., air gap) of the second genset 12 (Step 190), and continue to loop through steps 170-190 until the condition is satisfied.

Once the engine speed, crankshaft angular position, and voltage output of the second genset 12 have been substantially synchronized with the engine speed, crankshaft angular position, and voltage output of the first genset 12 or with the frequency, phase angle and voltage of the power on common bus 14 (Step 180: Yes), controller 29 may issue a breaker close command to electrically connect the output of the second genset 12 to common bus 14.

As described above, because the electrical output of generator 18 may lag behind the mechanical output of engine 16, by mechanically synchronizing the engine to another genset's engine or to the frequency and phase angle of common bus 14, (i.e., by matching and controlling the electrical frequency and phase angle characteristics based on a directly measured crankshaft angular speed and position) a time required for synchronization may be reduced.

It will be apparent to those skilled in the art that various modifications and variations can be made in the disclosed control system and method without departing from the scope of the disclosure. Other embodiments of the disclosed control system will be apparent to those skilled in the art from consideration of the specification and practice of the power system and methods disclosed herein. For example, although the frequency characteristic is described as being synchronized between genets 12 before phase angle and before voltage output, it is contemplated that any order of synchronization known in the art may be utilized. It is intended that the specification and examples be considered as exemplary only, with a true scope of the disclosure being indicated by the following claims and their equivalents.

What is claimed is:

1. A control system for use with a generator set, the control system comprising:
   a bus configured to receive power from the generator set;
   a first sensor configured to sense a frequency of power on the bus;
   a second sensor configured to sense a rotational frequency of a crankshaft of an engine of the generator set; and
   a controller in communication with the first and second sensors, the controller being configured to synchronize an electrical output of the generator set with the power on the bus by:
      determining a difference between the sensed frequency of the power on the bus and the sensed rotational frequency of the engine crankshaft, and
      adjusting the operation of the generator set to reduce the difference when the difference exceeds a threshold.

2. The control system of claim 1, further including:
   a third sensor configured to sense a voltage of electrical power produced by the generator set, and
   a fourth sensor configured to sense a voltage of the power on the bus;
   wherein the controller is in communication with the third and fourth sensors, the controller being further configured to match the voltage of the generator set to the voltage of the power on the bus by:
      determining a voltage difference between the sensed voltage from the third sensor and the sensed voltage from the fourth sensor, and adjusting the operation of the generator set to reduce the voltage difference when the voltage difference exceeds a second threshold.

3. The control system of claim 1, wherein the controller is further configured to electrically connect the electrical output of the generator set to the bus when the difference is within the threshold.

4. The control system of claim 1, wherein the controller is configured to adjust the operation of the generator set by adjusting a rotational speed of the engine crankshaft.

5. The control system of claim 1, wherein the second sensor includes an impulse transmitter configured to generate a pulse signal when the engine crankshaft passes a first angle.

6. The control system of claim 1, further comprising:
a third sensor configured to sense a phase angle of the power on the bus;
wherein the second sensor is further configured to sense an angular position of the engine crankshaft; and
wherein the controller is in communication with the third sensor and is further configured to synchronize the electrical output of the generator set with the power on the bus by:
determining, based on the sensed phase angle and the sensed angular position, a relationship between the angular position and an angular position of a rotor of a generator of the generator set,
storing the relationship in a memory of the controller for use during a plurality of synchronizations, and
adjusting the operation of the generator set based on the stored relationship.

7. The control system of claim 1, further comprising:
a third sensor configured to sense a phase angle of the power on the bus;
wherein the second sensor is further configured to sense an angular position of the engine crankshaft; and
wherein the controller is in communication with the third sensor and is further configured to match the angular position of the engine crankshaft to the phase angle of the power on the bus by:
determining a difference between the sensed phase angle and the sensed angular position of the engine crankshaft, and
adjusting the operation of the generator set when the difference between the sensed phase angle and the sensed angular position of the engine crankshaft exceeds a second threshold.

8. A control system for use with a first generator set and a second generator set, the control system comprising:
a first sensor configured to sense a rotational speed of a first crankshaft of an engine of the first generator set;
a second sensor configured to sense a rotational speed of a second crankshaft of an engine of the second generator set; and
a controller in communication with the first and second sensors, the controller being configured to synchronize an electrical output of the first generator set with an electrical output of the second generator set by:
determining a difference between the sensed rotational speed of the first engine crankshaft and the sensed rotational speed of the second engine crankshaft, and
adjusting the operation of the second generator set to reduce the difference when the difference exceeds a threshold.

9. The control system of claim 8, wherein the controller is configured to:
adjust the operation of the second generator set to reduce the difference when the electrical output of the first generator set is electrically disconnected from the electrical output of the second generator set, and
electrically connect the electrical output of the first generator set and the electrical output of the second generator set when the difference is within the threshold.

10. The control system of claim 8, wherein the controller is further configured to adjust the operation of the second generator set by adjusting the rotational speed of the second engine crankshaft.

11. The control system of claim 8, further including:
a third sensor configured to sense a voltage of electrical power produced by the first generator set; and
a fourth sensor configured to sense a voltage of electrical power produced by the second generator set,
wherein the controller is further configured to match the voltage of the first generator set to the voltage of the second generator set by:
determining a voltage difference between the sensed voltage from the third sensor and the sensed voltage from the fourth sensor, and
adjusting the operation of the second generator set to reduce the voltage difference when the voltage difference exceeds a second threshold.

12. The control system of claim 8, wherein each of the first and second sensors includes an impulse transmitter configured to generate a pulse signal when the respective first and second engine crankshafts pass a respective first angle.

13. The control system of claim 8, wherein:
the first sensor is further configured to sense an angular position of the first engine crankshaft;
the second sensor is further configured to sense an angular position of the second engine crankshaft; and
the controller is further configured to synchronize the electrical output of the first generator set with the electrical output of the second generator set by:
determining an angular position difference between the sensed angular position of the first engine crankshaft and the sensed angular position of the second engine crankshaft, and
adjusting the operation of the second generator set to reduce the angular position difference when the angular position difference exceeds a second threshold.

14. A method of providing power, the method comprising:
monitoring a frequency of power on a bus;
operating a generator set to produce an electrical output;
sensing a rotational frequency of a crankshaft of an engine of the generator set;
synchronizing the electrical output of the generator set with the power on the bus, before connecting the electrical output of the generator set to the bus, by:
determining a difference between the sensed frequency of the power on the bus and the sensed rotational frequency of the engine crankshaft, and
adjusting the operation of the generator set to reduce the difference when the difference exceeds a threshold; and
connecting the electrical output to the bus when the difference is within the threshold.

15. The method of claim 14, further comprising:
sensing a phase angle of the power on the bus; and
sensing an angular position of the engine crankshaft;
wherein synchronizing the electrical output of the generator set with the power on the bus further includes:
determining, based on the sensed phase angle and the sensed angular position, a relationship between the angular position of the crankshaft and an angular position of a rotor of a generator of the generator set;

storing the relationship for use during a plurality of synchronizations; and adjusting the operation of the generator set based on the stored relationship.

16. The method of claim 14, wherein the rotational frequency is sensed based on a pulse signal generated based on an angular position of the crankshaft.

17. A method of providing power, the method comprising:
operating a first generator set to produce electrical power;
monitoring a rotational speed of a first crankshaft of an engine of the first generator set;
operating a second generator set to produce electrical power;
monitoring a rotational speed of a second crankshaft of an engine of the second generator set;
synchronizing an electrical power output of the second generator set with an electrical power output of the first generator set, before connecting the electrical outputs, by:
determining a difference between the sensed rotational speed of the first engine crankshaft and the sensed rotational speed of the second engine crankshaft, and
adjusting the operation of at least one of the first and second generator sets to reduce the difference when the difference exceeds a threshold; and
connecting the electrical outputs when the difference is within the threshold.

18. The method of claim 17, further comprising:
sensing an angular position of the first engine crankshaft; and
sensing an angular position of the second engine crankshaft;
wherein synchronizing the electrical power output of the second generator set with the electrical power output of the first generator set further comprises:
determining an angular position difference between the sensed angular position of the first engine crankshaft and the sensed angular position of the second engine crankshaft, and
adjusting the operation of at least one of the first and second generator sets to reduce the angular position difference when the angular position difference exceeds a second threshold; and
wherein the electrical outputs are connected when the angular position difference is within the second threshold.

19. A power system, comprising:
a common bus;
a first generator set having a first engine with a first crankshaft drivingly coupled to a first generator to produce electrical power directed to the common bus;
a second generator set having a second engine with a second crankshaft drivingly coupled to a second generator;
a first sensor configured to sense a rotational speed of the first crankshaft;
a second sensor configured to sense a rotational speed of the second crankshaft; and
a controller in communication with the first and second generator sets and the first and second sensors, the controller being configured to synchronize an electrical output of the second generator set with an electrical output of the first generator set, when the common bus is connected to the electrical output of the first generator set and disconnected from the electrical output of the second generator set, by:
determining a difference between the sensed rotational speed of the first engine crankshaft and the sensed rotational speed of the second engine crankshaft, and
adjusting the operation of the second generator set to reduce the difference when the difference exceeds a threshold; and
wherein the controller is further configured to electrically connect the electrical output of the second generator set to the common bus when the difference is within the threshold.

* * * * *